United States Patent
Gitt et al.

(10) Patent No.: US 7,866,232 B2
(45) Date of Patent: Jan. 11, 2011

(54) TRANSMISSION FOR A COMMERCIAL VEHICLE WITH A MAIN GROUP AND A DOWNSTREAM GROUP

(75) Inventors: Carsten Gitt, Stuttgart (DE); Detlef Schnitzer, Denkendorf (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 12/381,372

(22) Filed: Mar. 11, 2009

(65) Prior Publication Data

US 2009/0205452 A1 Aug. 20, 2009

Related U.S. Application Data

(63) Continuation-in-part of application No. PCT/EP2007/007899, filed on Sep. 11, 2007.

(30) Foreign Application Priority Data

Sep. 15, 2006 (DE) .................. 10 2006 043 333

(51) Int. Cl.
*F16H 3/093* (2006.01)
(52) U.S. Cl. .................. 74/745; 74/329; 74/331
(58) Field of Classification Search ........... 74/745, 74/329

See application file for complete search history.

(56) References Cited

U.S. PATENT DOCUMENTS

| RE31,296 | E | * | 7/1983 | Richards ................. 74/339 |
| 4,856,375 | A | | 8/1989 | Beim |
| 5,381,703 | A | | 1/1995 | Rankin |
| 6,105,449 | A | * | 8/2000 | Genise et al. ............. 74/335 |
| 6,250,172 | B1 | * | 6/2001 | Pigozzi et al. ............ 74/336 R |
| 6,439,082 | B1 | * | 8/2002 | Onuki .................... 74/745 |

FOREIGN PATENT DOCUMENTS

| DE | 102 39 396 | 3/2004 |
| DE | 10 2005 032 224 | 3/2007 |
| EP | 0 882 908 | 12/1998 |

OTHER PUBLICATIONS

Lechner, "Fahrzeugetriebe", Springer Verlag, 1994, p. 157.

* cited by examiner

*Primary Examiner*—Sherry L Estremsky
*Assistant Examiner*—Erin D Bishop
(74) *Attorney, Agent, or Firm*—Klaus J. Bach

(57) ABSTRACT

In a commercial vehicle transmission with a main group and a downstream group including a downstream group countershaft, the downstream group includes means for decoupling the downstream group countershaft in direct through drive so that in direct through-drive the countershaft does not run in an oil sump and no churning losses occur thereby increasing vehicle transmission efficiency.

18 Claims, 4 Drawing Sheets

TRANSMISSION FOR A COMMERCIAL VEHICLE WITH A MAIN GROUP AND A DOWNSTREAM GROUP

This is a Continuous-In-Part Application of pending international patent application PCT/EP2007/007899 filed Sep. 11, 2007 and claiming the priority of German patent application 10 2006 043 333.5 filed Sep. 5, 2006.

BACKGROUND OF THE INVENTION

The invention relates to a transmission for a commercial vehicle with a main transmission group and by a downstream group.

A transmission diagram of the Roadranger transmission RT 9513 of the Fuller Company (Eaton) is known from Lechner, G., Fahrzeuggetriebe, Springer-Verlag, Berlin Heidelberg 1994, page 157, FIG. 6.46. This is a group transmission with an input constant, a main group and a downstream group. The downstream group comprises three gear wheel planes and two shift elements, with which three different ratio steps can be implemented, one of which is direct through-drive.

It is the object of the invention to provide a group transmission which has a high operational efficiency.

SUMMARY OF THE INVENTION

In a commercial vehicle transmission with a main group and a downstream group including a downstream group countershaft, the downstream group includes means for decoupling the downstream group countershaft in direct through drive so that in direct through-drive the countershaft does not run in an oil sump and no churning losses occur thereby increasing vehicle transmission efficiency.

The group transmission according to the invention can be used, in particular, in commercial vehicle transmissions. In these types of transmissions a main transmission is combined with a downstream group, in such a way that a large number of gears and/or large overall ratios are realized.

In such a transmission there is provided a downstream group which is implemented as a countershaft design. In direct through-drive—that is, with a ratio of i=1 in the downstream group—the countershaft of the downstream group can be decoupled from the rotary motion of the other shafts—that is, in particular, a main shaft and a downstream transmission group shaft. No churning losses therefore occur, since the countershaft does not rotate in the oil sump of the group transmission.

Good efficiency in direct through-drive is thereby achieved. Moreover, in an advantageous configuration the group transmission can be designed in such a manner that the vehicle is in direct through-drive for a major part of the total running time. High overall efficiency of the vehicle is thereby achieved.

In principle, the main transmission may be implemented in any desired manner. For example, it may be
 a manual, automated or partially automated transmission of countershaft design,
 an automatic transmission of epicyclic design,
 any continuously-variable transmission.

However, a combination of the downstream group described herein with a main group of countershaft design, which can also be operated with rotationally decoupled countershaft in direct through-drive, is especially advantageous. Such a main group is described in DE 102005032224.7, which is not a prior publication, the content of which should be considered as incorporated in this application in this respect. Furthermore, a vehicle transmission with a shift dome for direct manual selection of the gears is known from U.S. Pat. No. 5,381,703. It includes a countershaft which is drivable by a drive shaft and can be decoupled in direct gear by means of a shift element in order to improve efficiency. A vehicle transmission which comprises a drive shaft, an output shaft and a countershaft is also known from DE 102 39 396 A1. This transmission has a direct gear, the parts of the transmission which do not lie in the power path in direct gear being wholly or partially decoupled when the direct gear is selected.

At least one input constant may be provided in such a transmission.

Two countershafts which transmit the torque via two power paths may be provided. As a result, the shift group has high stability. In addition, the countershafts may be spaced a short distance from the main shaft. Moreover, flexing of shafts is low.

In the downstream group, three gear wheel planes may be provided, between each of which a shift element is arranged. Consequently, there is a gap between each of the fixed wheels of the countershafts. In an especially advantageous configuration, this gap can be used as a tool runout when producing the countershafts. It is therefore possible to produce the two countershafts from a single forging blank, the toothings being milled and/or ground directly.

With a distribution of the torque transmission via two countershafts, an angularly accurately synchronous arrangement of the fixed gear wheels on the two countershafts is advantageous, since, in that case, the torque is transmitted to exactly the same degree via both fixed wheels.

For this purpose, in an advantageous embodiment, the fixed wheels lying in a common gear wheel plane on the countershafts can be installed directly into the countershafts. To this end, the countershafts are first forged. The end contour of the fixed gears is then milled and/or ground together with the countershaft. However, only two fixed wheels of one gear wheel plane can be directly machined into the countershafts, so that the rest of the countershaft is assembled from separate parts. In this case—that is, when only one fixed wheel per countershaft is forged with the shaft—the separating line of the forging tool extends transversely to the longitudinal axis of the countershaft. However, if two or all fixed wheels of a countershaft are worked directly onto the shaft, the forging tool separating line extends in the direction of the countershaft.

Especially advantageously, the shift group may be designed such that the direct through-drive forms the highest gear—that is, the lowest transmission ratio. However, alternative designs are possible. For example, at least one overdrive gear may be provided.

It is very advantageous if no active component such as an oil pump or the like needs to be provided for the oil supply of the additional shift group. Such an oil pump must be provided in a group transmission with an epicyclic downstream group in order, inter alia, to ensure the oil supply of the planet wheel set. No losses are associated with the operation of this oil pump do not occur when an oil pump is omitted, so that the overall efficiency of the group transmission is further improved. In this case, all relevant points in the downstream group can especially advantageously be supplied with sufficient oil by means of splash lubrication—optionally in combination with oil guide plates or oil catching pockets.

The invention will become more readily apparent from the following description of advantageous embodiments thereof on the basis of the accompanying drawings.

DESCRIPTION OF PARTICULAR EMBODIMENTS

Figure 1:
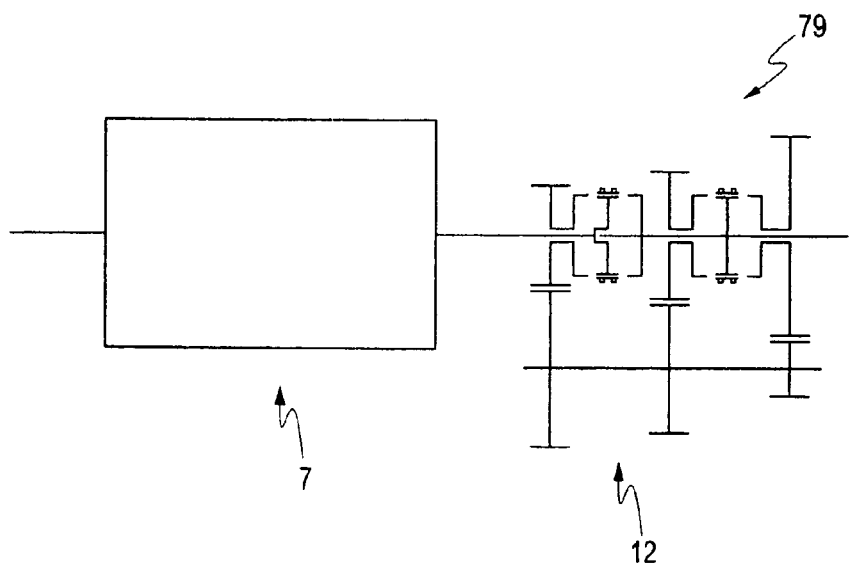
FIG. 1 shows a group transmission comprising a main group and a downstream group.

FIG. 1 shows schematically a group transmission 79 for commercial vehicles which comprises a main group 7 and a downstream group 12.

Figure 2:
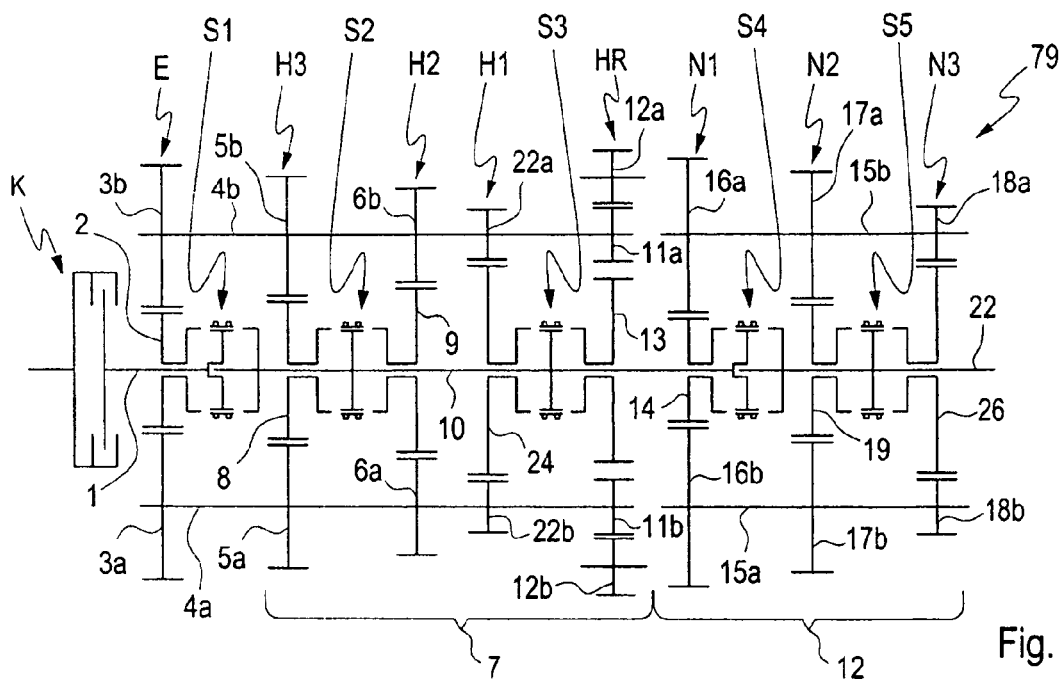
FIG. 2 shows a first embodiment of the group transmission according to FIG. 1.

FIG. 2 shows a first embodiment of a group transmission 79 according to the invention.

This group transmission 79 comprises an input constant E, the main group 7 and the downstream group 12 with three gear wheel planes N1, N2, N3 and two shift elements S4, S5.

With these two shift elements S4, S5 three different ratio steps can be implemented in the downstream group 12. These three different ratio steps are explained in more detail below.

A crankshaft (not shown in detail) of a drive engine is followed in the power flow by a starting clutch K which is followed by the group transmission 79.

The drive engine can be coupled by frictional engagement to a transmission input shaft 1 by means of the starting clutch K. This transmission input shaft 1 has an idler wheel 2 which meshes with two fixed wheels 3a, 3b arranged as shown in FIG. 2 diametrically opposite one another, which fixed wheels 3a, 3b are arranged on the front ends of two respective countershafts 4a, 4b. These fixed wheels 3a, 3b are followed, with respectively decreasing diameter, by three further fixed wheels 5a, 6a, 5b, 6b, 22a, 22b. Associated with the latter fixed wheels 5a, 6a, 5b, 6b, 22a, 22b are three gear wheel planes H3, H2, H1 of the main group 7. These three gear wheel planes H3, H2, H1 are allocated exclusively to forward gears. For this purpose, the three fixed wheels 5a, 6a, 5b, 6b, 22a, 22b of these two gear wheel planes H3, H2, H1 mesh with idler wheels 8, 9, 24 which are mounted coaxially rotatably on a main shaft 10. The front end of the main shaft 10 is mounted in a blind hole in the rear end of the transmission input shaft 1. Arranged between the idler wheel 2 of the transmission input shaft 1 and the front idler wheel 8 of the main shaft 10 is a first shift element S1, with which, in a rear position, the transmission input shaft 1 can be coupled non-rotatably to the main shaft 10, so that a direct through-drive to the downstream group 12 is established in the main group 7. In a front position, the front idler wheel 2 of the transmission input shaft 1 can be coupled non-rotatably to the latter. The neutral position of the first shift element S1 is located between the front position and the rear position.

A second shift element S2 is arranged axially between the idler wheels 9, 8 of the second gear wheel plane H2 and the third gear wheel plane H3. If this shift element S2 is moved to the front position, it establishes a non-rotatable connection between the front idler wheel 8 and the main shaft 10. Conversely, if this shift element S2 is moved to the rear position it establishes a non-rotatable connection between the rear idler wheel 9 and the main shaft 10.

Behind the two small fixed wheels 22a, 22b of the front countershafts 4a, 4b are located further small fixed wheels 11a, 11b respectively. These further fixed wheels 11a, 11b mesh via respective intermediate wheels 12a, 12b with an idler wheel 13 of the main shaft 10, so that the gear wheel plane HR of the reverse gears is formed. A third shift element S3 is arranged coaxially on the main shaft 10 between this gear wheel plane HR and the upstream gear wheel plane H2. Therefore, by means of the third shift element S3 the idler wheel 9 or the idler wheel 13 can be coupled selectively to the main shaft 10. A neutral position of the third shift element S3 is located between these respective coupling positions of the third shift element S3.

The main shaft 10 is partially continued in the following downstream group 12. Thus, at the front end of the downstream group 12 an idler wheel 14 is mounted coaxially rotatably on the main shaft 10. This idler wheel 14 meshes with two large fixed wheels 16a, 16b which are arranged non-rotatably on one of two rear countershafts 15a, 15b respectively. These two countershafts 15a, 15b are arranged diametrically opposite one another. The idler wheel 14 forms with the two large fixed wheels 16a, 16b the first gear wheel plane N1 of the downstream group 12. The fixed wheels 16a, 16b are followed by further fixed wheels 17a, 17b. These fixed wheels 17a, 17b mesh with an idler wheel 19 which is arranged coaxially rotatably on a downstream-group shaft 22 aligned with the main shaft 10. The idler wheel 19 therefore forms with the two middle fixed wheels 17a, 17b the second gear wheel plane N2 of the downstream group 12. By means of a fifth shift element S5, the idler wheel 19 is couplable non-rotatably to the downstream-group shaft 22, alternatively to an idler wheel 26 located downstream of the idler wheel 19. This idler wheel 26 meshes with two fixed wheels 18b, 18a arranged non-rotatably on the countershafts 15a, 15b respectively. In order to couple this rear idler wheel 26 to the downstream-group shaft 22, the fifth shift element S5 is moved to the rear position. Conversely, in order to couple the front idler wheel 19 to the downstream-group shaft 22 the fifth shift element S5 is moved to a front position. However, in order to connect the downstream-group shaft 22 non-rotatably to the main shaft 10, a fourth shift element S4 located upstream of the idler wheel 19 is moved to the rear position. In this case the downstream group 12 is in direct through-drive. Conversely, if this fourth shift element S4 is moved to a front position, it establishes a non-rotatable connection between the front idler wheel 14 of the downstream group 12, arranged upstream thereof, and the main shaft 10. The fourth and fifth shift elements S4, S5 each have a middle neutral position.

Figure 3:
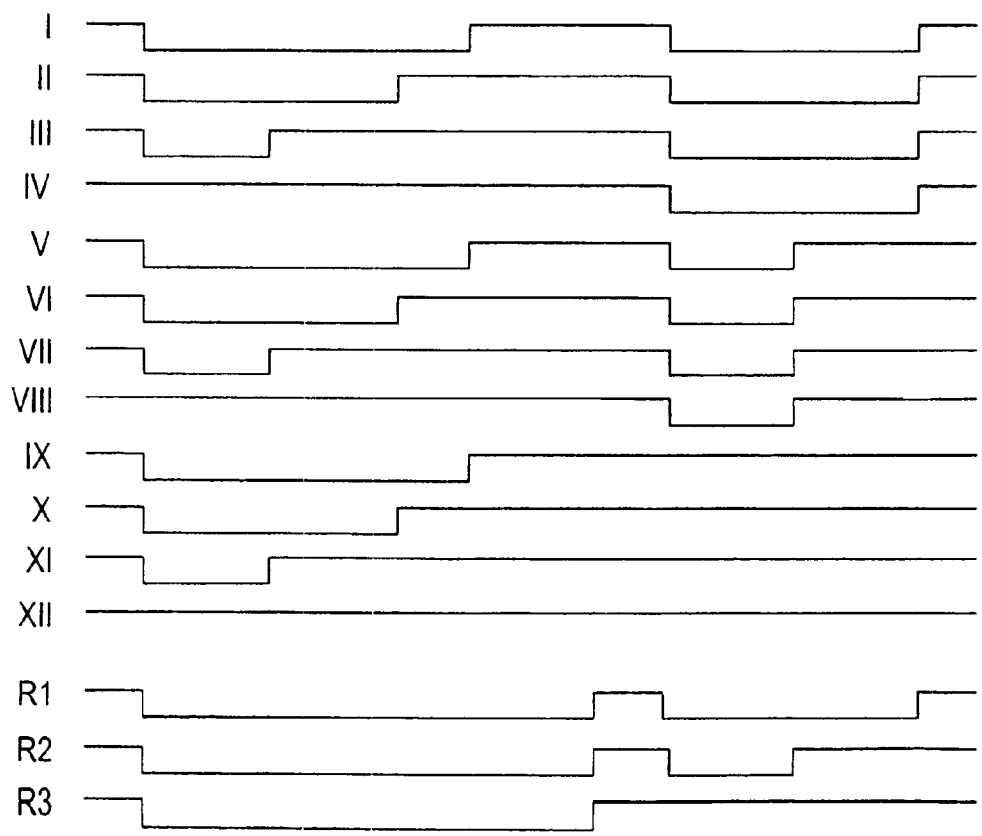
FIG. 3 shows the power flow in the individual gears of the group transmission according to FIG. 2.
Figure 4:
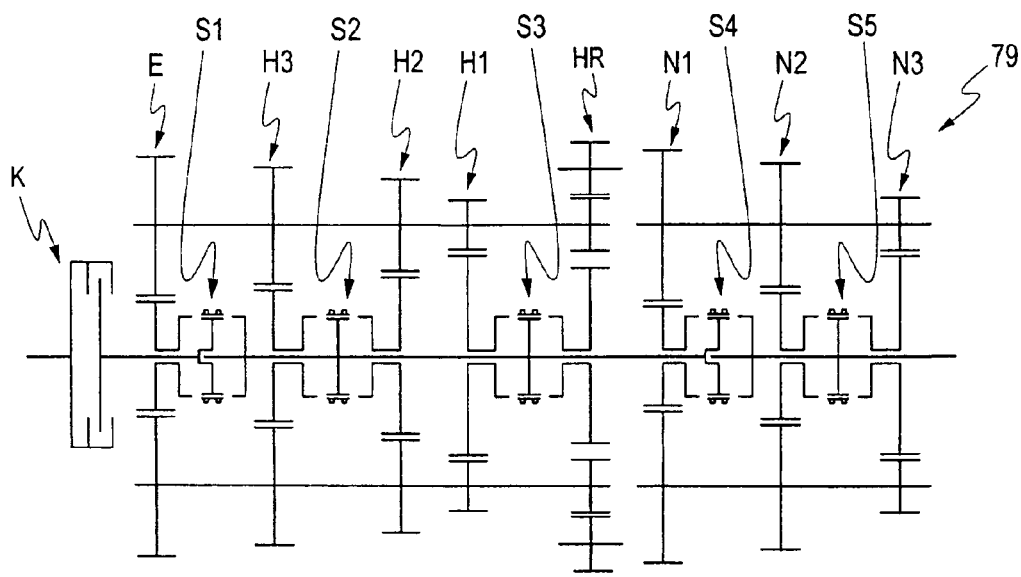
FIG. 4 shows a second embodiment of the group transmission according to FIG. 1.

FIG. 4 shows schematically the power flow in the group transmission 79 according to FIG. 3. This group transmission 79 is designed in such a manner that the downstream group 12 is implemented as a range group, which consequently makes three range zones available. A total of twelve forward gears I to XII and three reverse gears R1 to R3 are therefore formed.

In the first forward gear I
the first shift element S1 is in the front position,
the second shift element S2 is in the neutral position, the third shift element S3 is in the front position,
the fourth shift element S4 is in the front position and
the fifth shift element S5 is in the rear position.
In the second forward gear II
the first shift element S1 is in the front position,
the second shift element S2 is in the rear position,
the third shift element S3 is in the neutral position,
the fourth shift element S4 is in the front position and
the fifth shift element S5 is in the rear position.
In the third forward gear III
the first shift element S1 is in the front position,
the second shift element S2 is in the front position,
the third shift element S3 is in the neutral position,
the fourth shift element S4 is in the front position and
the fifth shift element S5 is in the rear position.
In the fourth forward gear IV
the first shift element S1 is in the rear position,
the second shift element S2 is in the neutral position and
the third shift element S3 is in the neutral position.
The main group 7 is therefore in direct through-drive.
Also in the fourth forward gear IV
the fourth shift element S4 is in the front position and
the fifth shift element S5 is in the rear position.
In the fifth forward gear V
the first shift element S1 is in the front position,
the second shift element S2 is in the neutral position,
the third shift element S3 is in the front position and
the fourth and fifth shift elements S4, S5 are each in the front position.
In the sixth forward gear VI
the first shift element S1 is in the front position,
the second shift element S2 is in the rear position,
the third shift element S3 is in the neutral position and
the fourth and fifth shift elements S4, S5 are each in the front position.
In the seventh forward gear VII
the first shift element S1 is in the front position,
the second shift element S2 is in the front position,
the third shift element S3 is in the neutral position and
the fourth and fifth shift elements S4, S5 are each in the front position.
In the eighth forward gear VIII
the first shift element S1 is in the rear position,
the second shift element S2 is in the neutral position and
the third shift element S3 is in the neutral position.
The main group 7 is therefore in direct through-drive.
Also in the eighth forward gear VIII
the fourth and fifth shift elements S4, S5 are each in the front position.
In the ninth forward gear IX
the first shift element S1 is in the front position,
the second shift element S2 is in the neutral position,
the third shift element S3 is in the front position,
the fourth shift element S4 is in the rear position and
the fifth shift element S5 is in the neutral position.
In the tenth forward gear X
the first shift element S1 is in the front position,
the second shift element S2 is in the rear position,
the third shift element S3 is in the neutral position,
the fourth shift element S4 is in the rear position and
the fifth shift element S5 is in the neutral position.
In the eleventh forward gear XI
the first shift element S1 is in the front position,
the second shift element S2 is in the front position,
the third shift element S3 is in the neutral position,
the fourth shift element S4 is in the rear position and
the fifth shift element S5 is in the neutral position.
In the twelfth forward gear XII
the first shift element S1 is in the rear position,
the second shift element S2 is in the neutral position,
the third shift element S3 is in the neutral position,
the fourth shift element S4 is in the rear position and
the fifth shift element S5 is in the neutral position.
Consequently, both the main group 7 and the downstream group 12 are shifted to direct through-drive, so that the direct gear is selected in the group transmission 79.
In the first reverse gear R1
the first shift element S1 is in the front position,
the second shift element S2 is in the neutral position,
the third shift element S3 is in the rear position,
the fourth shift element S4 is in the front position and
the fifth shift element S5 is in the rear position.
In the second reverse gear R2
the first shift element S1 is in the front position,
the second shift element S2 is in the neutral position,
the third shift element S3 is in the rear position and
the fourth and fifth shift elements S4, S5 are in the front position.
In the third reverse gear R3
the first shift element S1 is in the front position,
the second shift element S2 is in the neutral position,
the third shift element S3 is in the rear position,
the fourth shift element S4 is in the rear position and
the fifth shift element S5 is in the neutral position.
FIG. 4 shows, in a second embodiment, a group transmission with a downstream group. In this case the downstream group is used as a split group in order to form three each of three successive forward gears
I to III,
IV to VI,
VII to IX,
X to XII.
It can be seen from FIG. 5 that the first forward gear I of the group transmission according to FIG. 4 corresponds in power flow to the first forward gear 1 of the group transmission according to FIG. 2 and FIG. 3.
The second forward gear II corresponds in power flow to the fifth forward gear V according to FIG. 3.
The third forward gear III corresponds in power flow to the ninth forward gear IX according to FIG. 3.
The fourth forward gear IV corresponds in power flow to the second forward gear II according to FIG. 3.
The fifth forward gear V corresponds in power flow to the sixth forward gear VI according to FIG. 3.
The sixth forward gear VI corresponds in power flow to the tenth forward gear X according to FIG. 3.
The seventh forward gear VII corresponds in power flow to the third forward gear III according to FIG. 3.
The eighth forward gear VIII corresponds in power flow to the seventh forward gear VII according to FIG. 3.
The ninth forward gear IX corresponds in power flow to the eleventh forward gear XI according to FIG. 3.
The tenth forward gear X corresponds in power flow to the fourth forward gear IV according to FIG. 3.
The eleventh forward gear XI corresponds in power flow to the eighth forward gear VIII according to FIG. 3.
The twelfth forward gear XII corresponds in power flow to the twelfth forward gear XII according to FIG. 3.
The power flows in the three reverse gears R1 to R3 corresponds to the power flows in the three reverse gears R1 to R3 according to FIG. 3.
FIG. 6 shows, in a third embodiment, a group transmission with a downstream group. In this case the downstream group is used as a range group in order to form the first five forward gears I to V, analogously to FIG. 3. In the following seven forward gears VI to XII the downstream group divides up the forward gears as a split group, similarly to the second embodiment according to FIG. 4 and FIG. 5.

Figure 6:
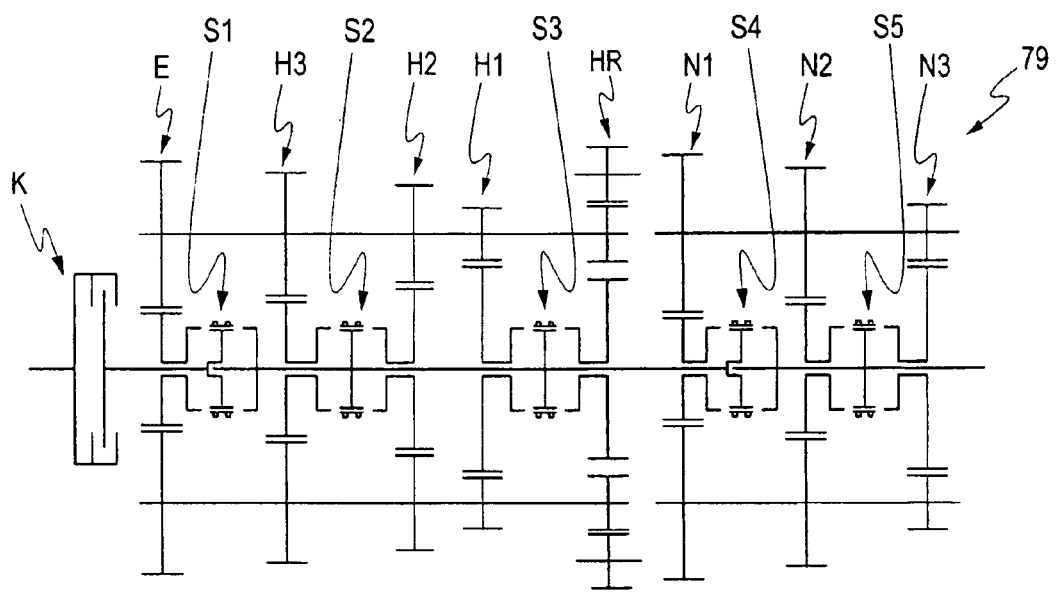
FIG. 6 shows a third embodiment of the group transmission according to FIG. 1.
Figure 7:
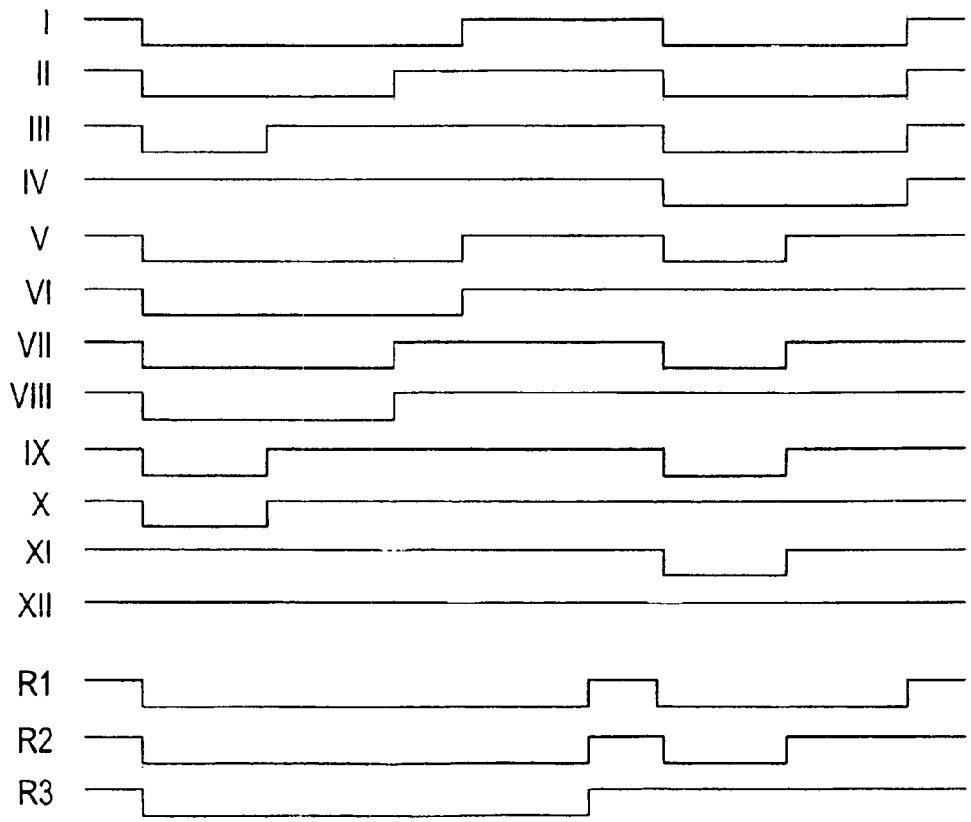
FIG. 7 shows the power flow in the individual gears of the group transmission according to FIG. 6.

It can be seen from FIG. 7 that the first five forward gears I to V of the group transmission according to FIG. 6 corresponds in power flow to the first five forward gears I to V of the group transmission according to FIG. 2 and FIG. 3.

Figure 5:
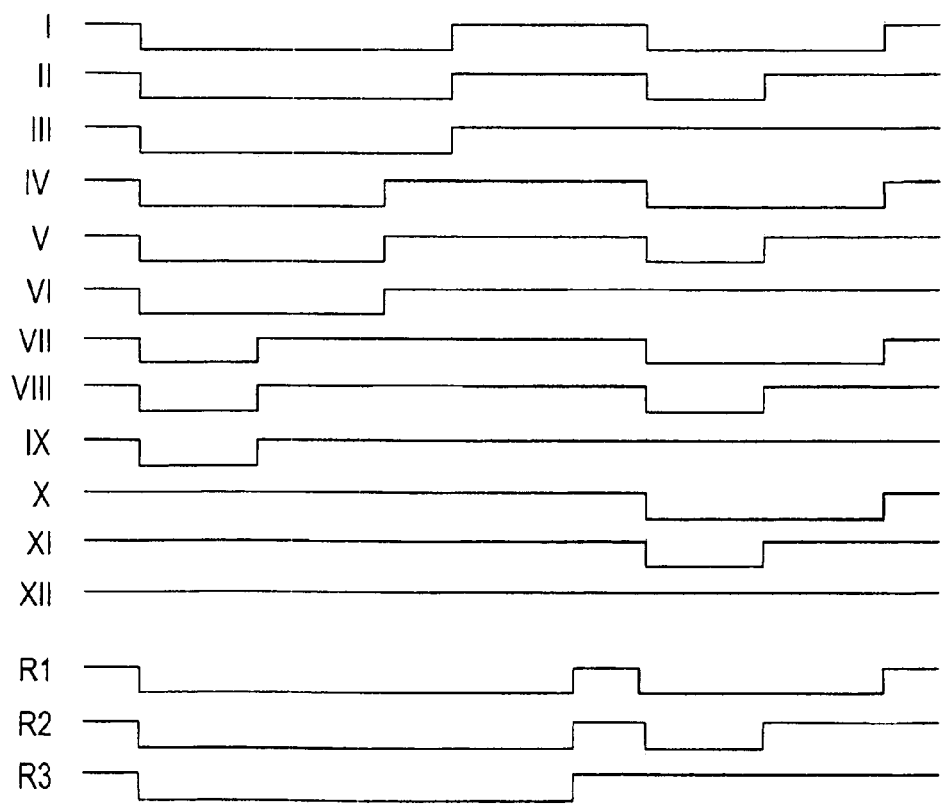
FIG. 5 shows the power flow in the individual gears of the group transmission according to FIG. 4.

From the sixth forward gear onwards the sequence of power flows according to FIG. 7 is more similar to the sequence of power flows according to FIG. 5 than to the sequence of power flows according to FIG. 3.

In this case the sixth forward gear VI corresponds in power flow to the third forward gear III according to FIG. 5.

The seventh forward gear VII corresponds in power flow to the fifth forward gear V according to FIG. 5.

The eighth forward gear VIII corresponds in power flow to the sixth forward gear VI according to FIG. 5.

The ninth forward gear IX corresponds in power flow to the eighth forward gear VIII according to FIG. 5.

The tenth forward gear X corresponds in power flow to the ninth forward gear IV according to FIG. 5.

The eleventh forward gear XI also corresponds in power flow to the eleventh forward gear XI according to FIG. 5.

The twelfth forward gear XII also corresponds in power flow to the twelfth forward gear XII according to FIG. 5.

The power flows in the three reverse gears R1 to R3 correspond to the power flows in the three reverse gears R1 to R3 according to FIG. 3.

The downstream group according to the three embodiments illustrated in FIG. 2 to FIG. 7 may be shifted both manually and in an automated or partially automated manner. In an automated or partially automated configuration, in particular, the middle neutral position of the fourth shift element S4 represented in the drawing may be omitted. In this case, this shift element S4 can be shifted only to the front position—that is, the idler wheel 14 is engaged—or to the rear position—that is, the main shaft 10 is connected to the downstream-group shaft 22. This has the advantage that an actuator which has only two positions can be used. In the case of hydraulic or pneumatic actuation this would be, for example, a so-called two-position cylinder.

In the case of manual shifting of the downstream group, no locking position in the middle position is required for the actuating device of the sliding sleeve S4, since this position, as already explained, is not required for operation of the downstream group.

The rearmost shift element S5 may also be shifted by means of an actuator with only two positions, so that here too the middle neutral position cannot be held continuously. However, this would have the disadvantage that, in direct through-drive in the downstream group, the countershaft remains permanently coupled to the rotary motion of the output shaft.

Figure 8:
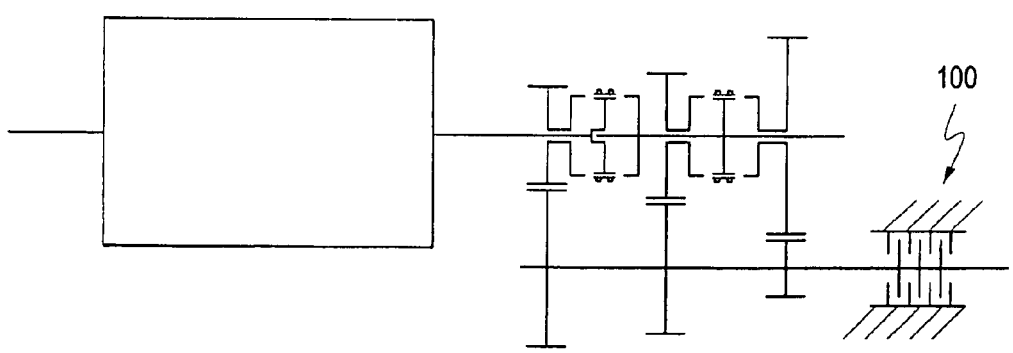
FIG. 8 shows a further embodiment of a group transmission wherein the downstream group has a countershaft with a countershaft brake.

The individual shift elements may be configured in such a manner that a rotational speed adaptation—that is, synchronization—is effected via friction cones in each shift operation. Alternatively, the downstream group may be configured in such a manner that individual shift elements are in the form of simple claw shifts. The shift operations can then be synchronized, for example, by means of a countershaft brake 100, as illustrated in FIG. 8. Such a countershaft brake 100 may be used in all three exemplary embodiments.

No oil pump or similar active element needs to be provided in the downstream group.

The embodiments described are only exemplary configurations. A combination of the features described for different embodiments is also possible. Further features of the device parts forming part of the invention, in particular features not described, are apparent from the geometries of the device parts represented in the drawings.

What is claimed is:

1. A commercial vehicle transmission with a main transmission group (7) followed by a downstream group (12) having a main group shaft (10), a downstream group shaft (22) mounted by means of rolling bearings directly opposite the main group shaft (10) and at least one downstream group countershaft (15a, 15b), and means for decoupling the at least one downstream group countershaft (15a, 15b) from the rotary motion of the downstream group shaft (22) when the downstream transmission group (12) is in direct through-drive, the means for decoupling the at least one downstream group countershaft (15a, 15b) being a first downstream group shift element (S4) which, in a rear position, connects the main group shaft (10) to the downstream group shaft (22) for direct through-drive and, in a front position, connects an idler wheel (14), which meshes with a fixed wheel (16b) of the downstream group countershaft (15a) to the main group shaft (10) for rotation therewith.

2. The commercial vehicle transmission as claimed in claim 1, wherein the first downstream group shift element (S4) is followed by a second downstream group shift element (S5) which is arranged between two further idler wheels (19, 26) which each mesh with a respective fixed wheel (17b, 18b) arranged on the at least one downstream group countershaft (15a), the second downstream group shift element (S5) coupling the downstream group main shaft (22) selectively to one of these two further idler wheels (19, 26).

3. The commercial vehicle transmission as claimed in claim 1, wherein the downstream group (12) has at least two ratio states.

4. The commercial vehicle transmission as claimed in claim 1, wherein the downstream group (12) is used as a range group for the formation of at least two forward gears.

5. The commercial vehicle transmission as claimed in claim 1, wherein the downstream group is a split group for the formation of at least two successive forward gears (I to III, IV to VI, VII to IX, X to XII).

6. The commercial vehicle transmission as claimed in claim 1, wherein the downstream group is used as a range group for the formation of at least two forward gears (I to V according to FIG. 7), and as a split group for the formation of further forward gears (VI to XII according to FIG. 7).

7. The commercial vehicle transmission as claimed in claim 1, wherein the downstream group (12) is actuated in an automated or partially automated manner, at least one downstream group shift element (S4) being actuated by means of an actuator which has exactly two shift positions.

8. The commercial vehicle transmission as claimed in claim 1, wherein at least two shift operations are synchronized by means of a central synchronizing unit—in the form of a countershaft brake (100).

9. The commercial vehicle transmission as claimed in claim 1, including a passive oil supply.

10. The commercial vehicle transmission as claimed in claim 1, wherein the main transmission group (12) has a main group shaft (10) and at least one main group countershaft (4a, 4b), and means for decoupling the at least one main group countershaft (4a, 4b) from the rotary motion of the main group shaft (10) when the main transmission group (7) is in direct through-drive.

11. A commercial vehicle transmission with a main transmission group (7) followed by a downstream group (12) having a main group shaft (10), a downstream group shaft

(22) and at least one downstream group countershaft (15a, 15b), and means for decoupling the at least one downstream group countershaft (15a, 15b), and means for decoupling the at least one downstream group countershaft (15a, 15b) from the rotary motion of the downstream group shaft (22) when the downstream transmission group (12) is in direct through-drive, the downstream group (12) having at least two downstream group countershafts (15a, 15b) which are arranged distributed uniformly around the main group shaft (22).

12. The commercial vehicle transmission as claimed in claim 11, wherein the downstream group (12) is used as a range group for the formation of at least two forward gears.

13. The commercial vehicle transmission as claimed in claim 11, wherein the downstream group is a split group for the formation of at least two successive forward gears (I to III, IV to VI, VII to IX, X to XII).

14. The commercial vehicle transmission as claimed in claim 11, wherein the downstream group is used as a range group for the formation of at least two forward gears (I to V according to FIG. 7), and as a split group for the formation of further forward gears (VI to XII according to FIG. 7).

15. The commercial vehicle transmission as claimed in claim 11, wherein the downstream group (12) is actuated in an automated or partially automated manner, at least one downstream group shift element (S4) being actuated by means of an actuator which has exactly two shift positions.

16. The commercial vehicle transmission as claimed in claim 11, wherein at least two shift operations are synchronized by means of a central synchronizing unit—in the form of a countershaft brake (100).

17. The commercial vehicle transmission as claimed in claim 11, including a passive oil supply.

18. The commercial vehicle transmission as claimed in claim 11, wherein the main transmission group (12) has a main group shaft (10) and at least one main group countershaft (4a, 4b), and means for decoupling the at least one main group countershaft (4a, 4b) from the rotary motion of the main group shaft (10) when the main transmission group (7) is in direct through-drive.

* * * * *